United States Patent Office 3,124,737
Patented Mar. 10, 1964

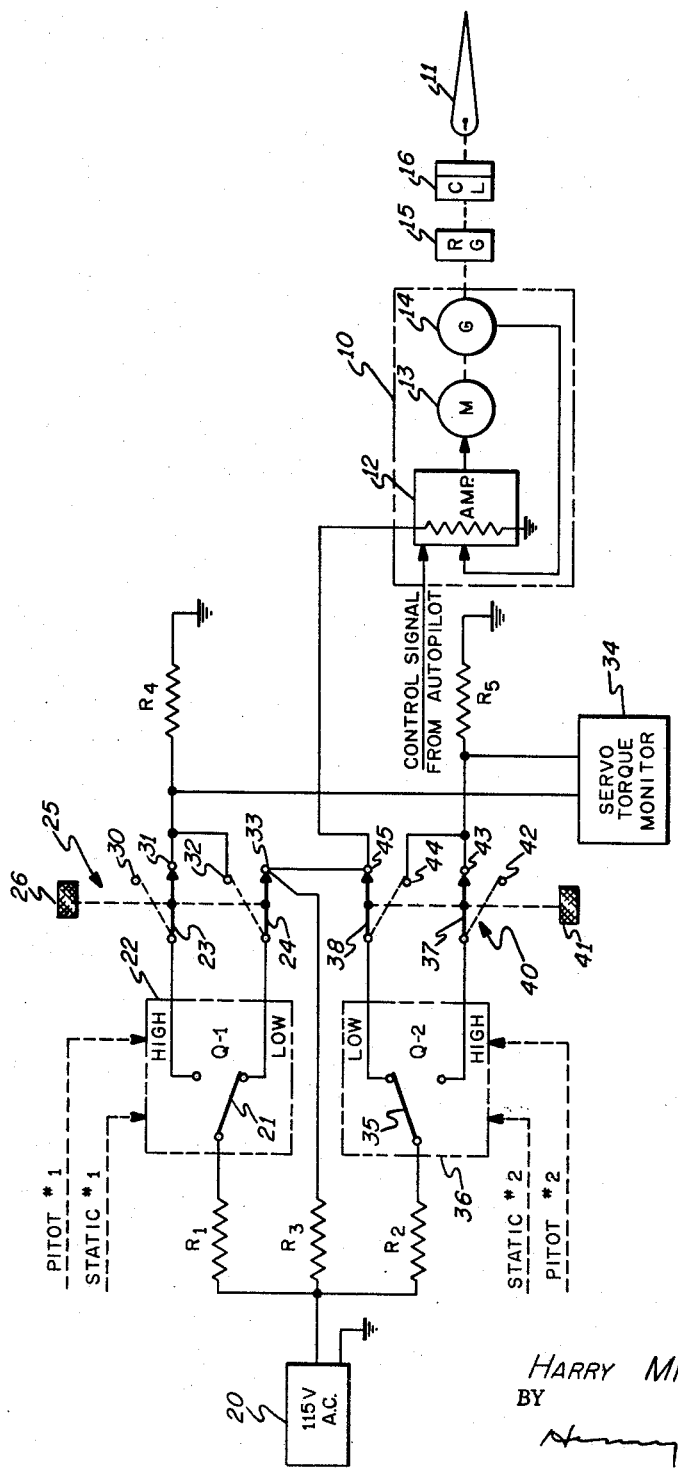

3,124,737
CONTROLLING AND MONITORING APPARATUS
Harry Miller, Scottsdale, Ariz., assignor to Sperry Rand Corporation, Great Neck, N.Y., a corporation of Delaware
Filed Apr. 2, 1962, Ser. No. 184,121
3 Claims. (Cl. 318—489)

This invention relates to apparatus for controlling the maximum torque applied by a servomechanism to a control surface of an aircraft and apparatus for monitoring the controlling apparatus.

With the advent of modern high-speed, high-altitude aircraft it is necessary that the torque applied by a servomechanism to a control surface of an aircraft be controlled in order that at low airspeeds and low altitude the servomechanism is capable of delivering maximum torque to rapidly deflect the control surface. At higher airspeeds and altitudes, the torque necessary to provide the same amount of aircraft movement is considerably less. In fact, if the maximum torque available at low airspeed was inadvertently applied at the higher airspeeds, the aircraft might be unduly strained structurally. It is therefore advisable to monitor the maximum servo torque available in terms of, for example, dynamic pressure experienced by the aircraft.

Previous attempts at varying the maximum servo torque available have involved varying the excitation of the servo amplifier which is connected to the servomotor that controls the control surface.

The prior art devices lack any arrangement for monitoring the apparatus for varying the excitation to the servomechanism. It will be appreciated that in the event the excitation current becomes too large or too small due to a malfunction in the apparatus associated with controlling the magnitude of the excitation current, a serious situation could arise due to the extreme sensitivity of the control surface at high airspeeds.

It is therefore an object of the present invention to provide simple control means for varying the excitation current and to provide in conjunction therewith monitoring apparatus.

It is an additional object of the present invention to provide simple control means for varying the excitation current and to provide in conjunction therewith monitoring apparatus capable of selectively monitoring predetermined portions of the excitation current control apparatus.

The above objects are achieved by controlling the excitation current through a single series connected resistor at high dynamic pressures while connecting the excitation current through a plurality of parallel resistors at low dynamic pressures. Monitoring means associated with the excitation current control circuit provides an indication of malfunctions of selected portions of the control circuit by means of a selective switching arrangement.

The single drawing shows an electrical schematic wiring diagram of the present invention.

The invention will be described with respect to a flight control system of the type described in U.S. Patent 3,007,656 issued November 7, 1961 to H. Miller et al. entitled "Aircraft Automatic Pilots" and particularly with respect to a servomechanism 10 for positioning an elevator control surface 11. The elevator 11 is positioned in accordance with a control signal from the autopilot system as indicated by the legend. The control signal is applied to a servo amplifier 12 of the servomechanism 10. The amplifier 12 is connected to a servo motor 13 which in turn is mechanically connected to drive a tachometer generator 14 which provides a rate feedback signal to the servo amplifier 12. The motor 13 is further connected through reduction gearing 16 and a clutch 16 to position the elevator 11 in a manner more fully described in the above mentioned 3,007,656.

The maximum output of the servomechanism 10 is limited by the maximum current that can be drawn by the servo amplifier 12. This current is fixed by the excitation voltage applied to the servo amplifier 12. As explained previously it is desirable to limit the maximum torque output capable of being supplied by the servo mechanism 10 in accordance with the dynamic pressure experienced by the aircraft.

In accordance with the present invention, a source of excitation current 20 is connected to a plurality of resistors $R_1$, $R_2$ and $R_3$. The resistor $R_3$ has its other end directly connected to the excitation terminal of the servo amplifier 12 to provide excitation current thereto. The resistor $R_1$ has its other end connected to the contact arm 21 of a dynamic pressure responsive switch 22. The switch 22 is responsive to the pilot and static pressures experienced by the aircraft from a pitot-static tube not shown in order that at low dynamic pressures the contact arm 21 contacts the low contact of the switch 22 while at high dynamic pressures the contact arm 21 contacts the high contact. The high and low contacts of the switch 22 connect to respective contact arms 23 and 24 of a manually operated test switch 25. The contact arms 23 and 24 are ganged and connected to an actuating knob 26. The test switch 25 includes contacts 30 and 31 which are cooperative with the contact arm 23. It further includes contacts 32 and 33 which are cooperative with the contact arm 24. The contact 30 is blank while the contacts 31 and 32 are connected to one end of a resistor $R_4$ and to one terminal of a servo torque monitoring device 34. The monitoring device 34 provides a visual, audible or corrective signal in a manner to be explained. The other end of the resistor $R_4$ is connected to ground potential. The contact 33 is connected to the excitation terminal of the servo amplifier 12.

In a similar manner the other end of the resistor $R_2$ is connected to the contact arm 35 of another dynamic pressure responsive switch 36. The switch 36 is also responsive to pitot and static pressures in order that at low dynamic pressures the contact arm 35 contacts the low contact of the switch 36 while at high dynamic pressures the contact arm 35 contacts the high contact. The high and low contacts of the switch 36 connect to respective contact arms 37 and 38 of another manually operated test switch 40. The contact arms 37 and 38 are ganged and connected to an actuating knob 41. The test switch 40 includes contacts 42 and 43 which are cooperative with the contact arm 37. It further includes contacts 44 and 45 which are cooperative with the contact arm 38. The contact 42 is blank while the contacts 43 and 44 are connected to one end of a resistor $R_5$ and to the other terminal of the monitoring device 35. The other end of the resistor $R_5$ is connected to ground potential. The contact 45 is connected to the excitation terminal of the servo amplifier 12.

In operation, at low dynamic pressures the contact arms 21 and 35 contact the low contacts of the switches 25 and 36 respectively. With the contact arms 23, 24 and 37, 38 of the test switches 25 and 40 respectively in the solid line positions as shown, the resistors $R_1$, $R_2$, and $R_3$ are connected in parallel between the current source 20 and the servo amplifier 12 thereby providing a low impedance bath therebetween and permitting maximum excitation current to flow.

At high dynamic pressures the contact arms 21 and 35 contact the high contacts of the switches 22 and 36 respectfully. When the test system 25 and 30 remains in the position shown the resistor $R_1$ and $R_2$ are disconnected from the servo amplifier 12 thereby leaving only the resistor $R_3$ between the source 20 and the servo amplifier 12. This imposes the greatest impedance therebetween and thus reduces the excitation current as well as the maximum torque capable of being applied by the servomechanism 10.

The dynamic pressure switches 22 and 36 are either connected to the same source of dynamic pressure information or they are otherwise arranged to operate simultaneously. The resistors $R_4$ and $R_5$ are in series with the high contacts of the switches 22 and 36 to maintain the proper level of standby current in the high circuit and thus insure proper operation of the monitoring device 34 in the event of malfunction.

The operation of the monitoring device 34 will now be described with respect to providing a visual indication e.g. a light. To monitor the circuit during preflight, the pilot manually positions the switches 25 and 40 to the dotted line positions. Independent operation of the switch 25 or 40 should cause the light of the monitoring device 34 to go on while simultaneous operation of the switches 25 and 40 to the dotted line positions should cause the device 34 to remain dark. If this does not occur, it indicates a passive malfunction.

When airborne the monitor light should normally be out with the switches 25 and 40 in their solid line positions except that the light will go on momentarily when passing through the dynamic pressure switching point. If the monitor light should light up during flight, it is indicative of a failure and the automatic pilot should be disengaged.

The pilot can also operate the test switches 25 and 40 when airborne and the results should be the same as the preflight check described above.

Each portion of the circuit can be separately monitored and analyzed. Specifically the following faults can be detected an analyzed:

(1) Failure of the resistors $R_1$ or $R_2$
(2) Failure of the resistor $R_3$
(3) Open in the low circuit
(4) Open in the high circuit
(5) Failure of the switches 21 or 36
(6) Open in the monitor circuit
(7) Pneumatic line failure between the pitot-static source and the switches 22 and 36.

These malfunctions may be detected as follows:

An open in the resistor $R_1$ or $R_2$ will cause the light to remain dark when the test switch 25 or 40 respectively is operated i.e. in the dotted line position. A short in the resistor $R_1$ or $R_2$ will cause the light to go on when both switches 25 and 40 are operated simultaneously. If the resistor $R_1$ or $R_2$ opens in flight, it will result in reduced torque at low dynamic pressures and glowing of the light at high dynamic pressures.

An open in the resistor $R_3$ will cause a decrease in the maximum torque at low dynamic pressure and zero output at high dynamic pressure.

An open anywhere in either low circuit will result in a decrease in low torque and operation of the monitor at high dynamic pressure. It should be noted that the $R_3$ circuit to the servo amplifier 12 is routed through switches 25 and 40 in series to insure that they can detect the entire low circuit. Opens beyond the switches 25 and 40 will result in zero amplifier output.

An open in either high circuit up to the resistor $R_4$ or $R_5$ will result in operation of the light a high dynamic pressures. An open in the resistor $R_4$ or $R_5$ will be detected by simultaneous operation of the test switches 25 and 40 in which event the light will go on.

Failure of either of the dynamic pressure responsive switches 22 and 36 will cause disparity in the operation causing unbalance in the $R_4$ and $R_5$ circuit. The resulting voltage drop between the inputs of the resistors $R_4$ and $R_5$ will cause the monitoring device 35 to light. If either of the switches 22 or 36 fails to make contact with either of its respective high or low contacts, it will result in reduced torque at low dynamic pressure and operation of the light at high dynamic pressure.

An open in the monitor circuit will cause the monitor light to remain dark when the test switches 25 and 40 are operated.

A failure in the pneumatic line will cause disparity on the operation of the switches 22 and 36 causing unbalance in the $R_4$ and $R_5$ circuits and the monitor light will go on.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for controlling the maximum torque applied by a servo mechanism to a control surface of an aircraft and monitoring apparatus therefor comprising
   (1) a source of power,
   (2) first, second and third resistors, each having one end connected to said source of power, said third resistor having its other end connected to said servo mechanism,
   (3) first and second aircraft condition responsive switches connected to the other ends of said first and second resistors respectively, said first and second condition responsive switches having first and second operating positions respectively, the particular position depending upon the magnitude of the condition experienced by said aircraft,
   (4) first and second test switches connected to said first and second condition responsive switches respectively, each of said first and second test switches having first and second pairs of operating positions adapted to be responsive to said first and second operating positions of said first and second condition responsive switches respectively,
   (5) fourth and fifth resistors, each having one end connected to respective first and second test switches and the other end connected to a predetermined potential,
   (6) and monitoring means having one end connected between said first test switch and said fourth resistor and another end connected between said second test switch and said fifth resistor whereby at one aircraft condition the first, second and third resistors are connected in parallel to form a low resistance network between said source of power and said servo mechanism and at another condition only the third resistor is connected between said source of power and said servo mechanism to form a high resistance network therebetween in which portions of said circuit may be selectively monitored by said monitoring means.

2. Apparatus for controlling the excitation current to a load member in accordance with an independent variable and monitoring the operation thereof comprising
   (1) a source of power for providing excitation current,
   (2) first, second and third resistors, each having one end connected to said source of power,
   (3) a load member,
   (4) said third resistor having its other end connected to said load member
   (5) first and second condition responsive switches responsive to said independent variable, said first and second switches having first and second operating positions respectively, the particular position depending upon the magnitude of said independent variable,
   (6) the other ends of said first and second resistors being connected to said first and second switches respectively,
   (7) first and second test switches connected to said first and second condition responsive switches respectively, each of said first and second test switches having first and second pairs of operating positions adapted to be responsive to said first and second operating positions of said first and second condition responsive switches respectively, (8) fourth and fifth resistors, each having one end connected to respective first and second test switches and the other end connected to a predetermined potential, (9) and monitoring means having one end connected between said first test switch and said fourth resistor and another end connected between said second test switch and said fifth resistor whereby at one magnitude of said independent variable the first, second and third resistors are connected in parallel to form a low resistance network between said source of power and said load member and at another condition only the third resistor is connected between said source of power and said load member to form a high resistance network therebetween in which portions of said circuit may be selectively monitored by said monitoring means.

3. Apparatus for controlling the excitation current to a load member in accordance with an independent variable and monitoring the operation thereof comprising (1) a source of power for providing excitation current,
(2) a plurality of resistors, each having one end connected to said source of power,
(3) a load member,
(4) one of said resistors having its other end connected to said load member,
(5) first switch means responsive to said independent variable, the other ends of the other resistors being connected to respective first switch means,
(6) each of said first switch means having first and second contacts,
(7) second switch means connected to respective first switch means,
(8) additional resistors having one end connected to respective second switch means and another end connected to a predetermined potential,
(9) and monitoring means connected between respective second switch means and said additional resistors, each of said second switch means including means for selectively connecting respective first switch means alternatively to said load member or to said monitoring means.

No references cited.